T. A. EDISON.
METHOD OF MAKING SOUND RECORD MOLDS.
APPLICATION FILED JAN. 6, 1912.
1,099,349.
Patented June 9, 1914.
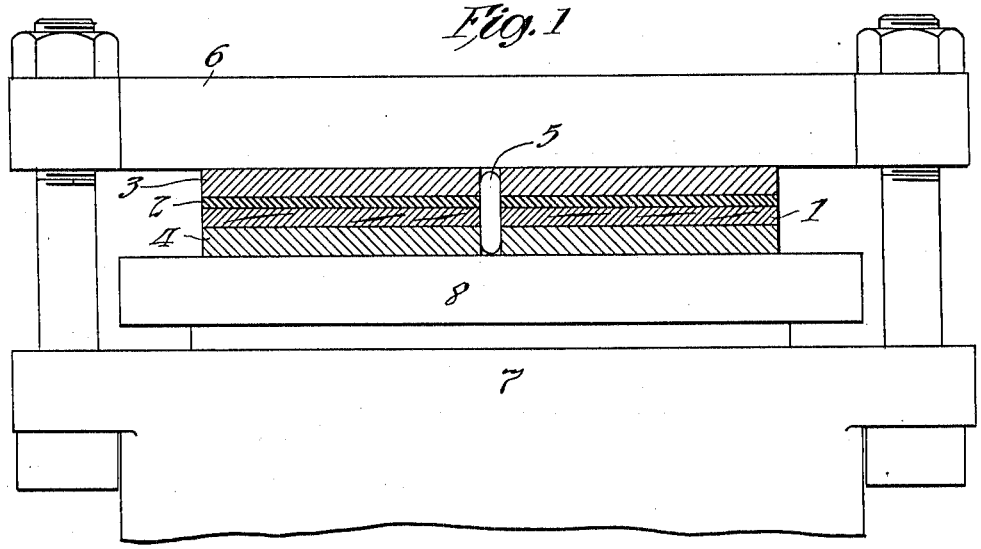
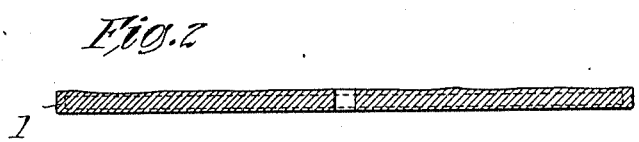
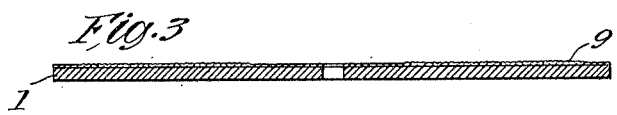

UNITED STATES PATENT OFFICE.

THOMAS A. EDISON, OF LLEWELLYN PARK, WEST ORANGE, NEW JERSEY, ASSIGNOR TO NEW JERSEY PATENT COMPANY, OF WEST ORANGE, NEW JERSEY, A CORPORATION OF NEW JERSEY.

METHOD OF MAKING SOUND-RECORD MOLDS.

1,099,349.          Specification of Letters Patent.          Patented June 9, 1914.

Application filed January 6, 1912. Serial No. 669,867.

*To all whom it may concern:*

Be it known that I, THOMAS A. EDISON, a citizen of the United States, and a resident of Llewellyn Park, West Orange, in the county of Essex and State of New Jersey, have invented certain new and useful Improvements in Methods of Making Sound-Record Molds, of which the following is a description.

My invention relates to methods of making sound record molds, and more particularly to the provision of a backing for record molds of the flat or disk type.

The usual practice of making working molds for disk records is to electroplate a copper matrix or negative on a master or sub-master record, and, after detaching the matrix from the master or sub-master to secure it to a thick metallic backing plate, this plate having heretofore been made of copper. As, however, the copper commercially obtainable for this purpose is more or less porous and formed in strata below the rolled surfaces thereof, a mold having a backing of this material, when subjected to the enormously high pressures employed in molding disk records of hard materials such as the condensation products which form the subject matter of applications of Jonas W. Aylsworth, Serial Nos. 496,060, 543,238 and 604,982, yields in some spots more than in others; so that the sound records produced therefrom, instead of being plane, are formed with minute undulations or irregularities, which produce sounds when the record is of the hill and dale type, these sounds interfering greatly with the accuracy of the reproduction. Even if the copper is subjected to a high pressure before being secured to the matrix, the porous or stratified nature thereof prevents the obtaining of a perfectly homogeneous backing and numerous small pores are opened up when the copper is turned down to size and also when it is subsequently subjected to pressure.

The principal object of my invention is the provision for a mold of a backing or body free from these objections. I have found that commercial rolled brass may be obtained which is suitable for the construction of such a backing. Although this material is not porous and stratified as is copper, it is softer in some places than in others; and in order to render the same suitable for my purpose, I preferably compress a rough disk of the same in a press under a uniform pressure considerably higher than the pressure employed in molding the records, so as to produce a compacted disk of substantially uniform density. This disk, when properly finished and secured to the matrix, maintains its true shape during the molding of the record.

Other objects of my invention will appear more fully in the following specification and appended claims:

In order that my invention may be more fully understood, attention is hereby directed to the accompanying drawings forming a part of this specification and illustrating one method of forming a record mold in accordance with my invention.

In the drawings Figure 1 represents partly in side elevation and partly in central vertical section a rough disk or backing of brass and also the apparatus for compressing said disk; Fig. 2 represents in central vertical section the rough disk of brass after removal from the press; and Fig. 3 represents in central vertical section, a finished mold constructed in accordance with my invention.

In all of the views like parts are designated by the same reference numerals.

Referring to the drawings and more particularly to Fig. 1, the numeral 1 designates a disk of commercial brass, preferably stamped from a sheet of rolled brass, the soft places therein being indicated figuratively by dark transverse lines. On top of this plate of brass is placed a disk 2 which may be formed of any suitable material which yields slightly under high pressures, such as leather or a fusible condensation product, such as the well known shellac substitutes and other substances which are referred to by the term "phenol resin" in applications of Jonas W. Aylsworth, Serial Nos. 496,060 and 541,764. These disks 1 and 2 are placed between steel plates 3 and 4, all of these parts being held in proper concentric relationship by a centering pin 5. The disks 1 and 2 and plates 3 and 4, after being assembled, as stated above, are placed between the members 6 and 7 of a press and are there subjected to a considerable pressure, preferably about 2100 lbs. per square inch when the records are formed of the condensation products referred to in the applications of Aylsworth mentioned in the third paragraph of this specification. If the disk 2 is made of the fusible condensation products mentioned above, I provide the press with a heating device, such as the steam table 8, in order to apply heat to render the said disk slightly plastic and yielding and permit the uniform application of pressure to the opposite surfaces of the brass regardless of the unequal yielding of the brass due to the soft places therein. If certain materials such as leather or lead are employed instead of the fusible condensation product mentioned above the steam table may be omitted and the pressure applied without the application of heat.

After the disk 1 is removed from the press, the upper surface of the said disk, that is the surface previously in contact with the disk 2, is formed with minute irregularities, shown roughly in Fig. 2. The disk 1 is now turned down with a diamond cutting tool until the opposite surfaces thereof are perfectly true planes, the contour of the disk after this operation being shown in dotted lines in Fig. 2. This disk may now be secured to the copper matrix or electroplate 9, the surface of the latter in contact with the disk having been preferably likewise turned to a true plane with a diamond cutting tool and the matrix and backing being soldered together around their peripheries. This manner of mounting the electroplate on its backing is more fully disclosed and claimed in an application of Sherwood T. Moore, Serial No. 663,520, filed December 2, 1911.

With a mold formed in this manner, I have made it possible to obtain disk sound records having a record groove of the vertically undulating type in which the record surface is free from irregularities and undulations other than the record impression, so that a reproduction of a high degree of accuracy is obtainable therefrom, the pressures employed in molding a record of the hard compositions referred to above being about 1200 lbs. per square inch.

It is understood that the pressure in compacting the brass backing prior to the finishing thereof may be applied in any suitable manner and that numerous other modifications may be made in the specific embodiment of my invention herein disclosed without departing from the spirit of my invention.

What I claim as new and desire to protect by Letters Patent of the United States is as follows:

1. The process of making molds for sound records which consists in forming a matrix from a master or sub-master record, forming a backing therefor of non-porous material, subjecting said backing to a uniform pressure, and mounting the matrix on the same, substantially as set forth.

2. The process of making molds for sound records which consists in forming a matrix from a master or submaster record, forming a brass backing therefor, subjecting said backing to a uniform pressure, and mounting the matrix on the same, substantially as set forth.

3. The process of making molds for sound records which consists in forming a matrix from a master or submaster record, forming a backing therefor of non-porous material, subjecting said backing to a uniform pressure substantially higher than the pressures employed in molding records, and securing said backing to said matrix, substantially as set forth.

4. The process of making molds for sound records which consists in forming a matrix from a master or submaster record, forming a brass backing therefor, subjecting said backing to a uniform pressure substantially higher than the pressures employed in molding records, and securing said backing to said matrix, substantially as set forth.

5. The process of making molds for sound records which consists in forming a matrix from a master or submaster record, forming a backing therefor of non-porous material, subjecting said backing to a uniform pressure substantially higher than 1200 pounds per square inch, and securing said backing to said matrix, substantially as set forth.

6. The process of making molds for sound records which consists in forming a matrix from a master or submaster record, forming a backing therefor of non-porous material, covering one face of said backing with a layer of yieldable material, subjecting the said layer and backing to a uniform pressure, and securing said backing to said matrix, substantially as described.

7. The process of making molds for sound records which consists in forming a matrix from a master or submaster record, forming a brass backing therefor, covering one face of said backing with a layer of yieldable material, subjecting the said layer and backing to a uniform pressure, and securing said backing to said matrix, substantially as described.

8. The process of making molds for sound records which comprises forming a matrix from a master or submaster record, forming a backing therefor, subjecting the backing to a uniform pressure, and mounting the matrix on the same, substantially as set forth.

9. In the process of making molds for sound records, forming a body member, subjecting the same to a uniform pressure and truing the surface thereof, substantially as set forth.

10. In the process of making molds for sound records, forming a body member, covering one face of said member with yieldable material, subjecting the member and material to a uniform pressure, and truing the surface of the member, substantially as set forth.

11. The process of making molds for sound records which consists in forming a matrix with a trued surface from a master or submaster record, forming a backing therefor of rolled brass, subjecting said backing to a pressure substantially higher than 1200 lbs. per square inch, truing the surface of said backing, and securing the same to said matrix with the trued surfaces of the matrix and backing in contact, substantially as set forth.

12. The process of making molds for sound records which consists in forming a matrix from a master or submaster record, forming a backing therefor of non-porous material, covering one face of said backing with a layer of yieldable material, subjecting said layer and backing to a uniform pressure, truing the surface of said backing, and securing said backing to said matrix, substantially as set forth.

13. In the process of making molds for sound records forming a body member, covering one face of said member with thermo plastic material, applying heat to said material to render the same plastic, subjecting the member and material to a uniform pressure, and truing the surface of the member, substantially as set forth.

14. The process of making molds for sound records which consists in forming a matrix from a master record, truing the rear surface of said matrix, forming a backing therefor of non-porous material, covering one face of said backing with a layer of yieldable material, subjecting said layer and backing to a uniform pressure, truing the surface of said backing, and securing said backing to said matrix, substantially as set forth.

15. The process of making molds for sound records which consists in forming a matrix from a master record, truing the rear surface of said matrix, forming a backing therefor of rolled brass, covering one face of said backing with a layer of yieldable material, subjecting said layer and backing to a uniform pressure, truing the surface of said backing, and securing said backing to said matrix, substantially as set forth.

This specification signed and witnessed this 2nd day of January 1912.

THOS. A. EDISON.

Witnesses:
 FREDERICK BACHMANN,
 ANNA R. KLEHM.